(12) United States Patent
Gupta (10) Patent No.: US 11,195,179 B2
(45) Date of Patent: Dec. 7, 2021

(54) DETECTING CASHBACK AND OTHER RELATED REIMBURSEMENT FRAUDS USING BLOCKCHAIN TECHNOLOGY

(71) Applicant: Dell Products L.P., Round Rock, TX (US)

(72) Inventor: Shubham Gupta, Jaipur (IN)

(73) Assignee: Dell Products L.P., Round Rock, TX (US)

( * ) Notice: Subject to any disclaimer, the term of this patent is extended or adjusted under 35 U.S.C. 154(b) by 190 days.

(21) Appl. No.: 16/176,307

(22) Filed: Oct. 31, 2018

(65) Prior Publication Data

US 2020/0134621 A1 Apr. 30, 2020

(51) Int. Cl.
*G06Q 20/40* (2012.01)
*H04L 9/08* (2006.01)
*H04L 9/06* (2006.01)

(52) U.S. Cl.
CPC ......... *G06Q 20/401* (2013.01); *H04L 9/0643* (2013.01); *H04L 9/088* (2013.01); *G06Q 2220/00* (2013.01)

(58) Field of Classification Search
CPC .. G06Q 20/40; G06Q 2220/00; G06Q 20/389; H04L 9/0643; H04L 9/08; H04L 2209/38; H04L 2209/56; H04L 9/3239
See application file for complete search history.

(56) References Cited

U.S. PATENT DOCUMENTS 8,478,614 B2 7/2013 Hamper
8,880,417 B2 * 11/2014 Hamper ................. G06Q 40/12
705/5

(Continued)

OTHER PUBLICATIONS

Bant Cant, et al., Smart Contracts in Financlal Services: Getting from Hype to Reality, CapGemini Consulting, 2016, available at https://www.capgemini.com/consulting-de/wp-content/uploads/sites/32/2017/08/smart_contracts_paper_long_0.pdf (published online Aug. 2017), 25 pages. (Year: 2016).*

(Continued)

*Primary Examiner* — Steven S Kim
*Assistant Examiner* — Jason B Fenstermacher
(74) *Attorney, Agent, or Firm* — Ryan, Mason & Lewis, LLP (57) ABSTRACT

Methods, apparatus, and processor-readable storage media for detecting cashback and other related reimbursement frauds are provided herein. An example computer-implemented method includes implementing, in response to a transaction between a user and a first enterprise, a block in a blockchain network, wherein the block comprises transaction-related information comprising reimbursement-related data and cryptographic information; generating a smart contract in conjunction with the block, wherein the smart contract comprises a software protocol pertaining to carrying out a reimbursement process, related to the transaction, between the user and a second enterprise; executing the smart contract in response to an indication that transaction-related information provided to the second enterprise by the user has been verified against the transaction-related information contained within the block; and modifying, in response to the execution of the smart contract, a status identifier of the block, wherein the modification of the status identifier reduces subsequent access to the block.

20 Claims, 5 Drawing Sheets

(56) References Cited

U.S. PATENT DOCUMENTS

| | | | |
|---|---|---|---|
| 10,749,681 B2* | 8/2020 | Andrade | H04L 9/0866 |
| 10,891,621 B2* | 1/2021 | Oka | G06Q 20/24 |
| 2015/0058185 A1 | 2/2015 | Hamper | |
| 2017/0109748 A1* | 4/2017 | Kote | G06Q 20/382 |
| 2017/0177898 A1* | 6/2017 | Dillenberger | H04L 9/3236 |
| 2017/0200234 A1* | 7/2017 | Morse | G06F 3/0482 |
| 2018/0040041 A1* | 2/2018 | Metnick | G06Q 30/0609 |
| 2018/0089752 A1* | 3/2018 | Barrett | G06Q 40/00 |
| 2018/0144156 A1* | 5/2018 | Marin | G06F 21/54 |
| 2018/0150922 A1 | 5/2018 | Lyman et al. | |
| 2018/0276626 A1* | 9/2018 | Laiben | G06Q 20/02 |
| 2018/0315047 A1* | 11/2018 | Kennedy | G06Q 20/02 |
| 2019/0172057 A1* | 6/2019 | Vincent | G06Q 50/30 |
| 2019/0205873 A1* | 7/2019 | Kamalsky | H04L 9/0637 |
| 2019/0228409 A1* | 7/2019 | Madisetti | H04L 9/0637 |
| 2019/0236598 A1* | 8/2019 | Padmanabhan | G06Q 20/4016 |
| 2019/0238316 A1* | 8/2019 | Padmanabhan | H04L 9/3297 |
| 2019/0370810 A1* | 12/2019 | Hu | G06Q 20/401 |
| 2020/0013053 A1* | 1/2020 | Amin | H04L 63/10 |
| 2020/0074389 A1* | 3/2020 | Mohammad | G06Q 10/087 |
| 2020/0104847 A1* | 4/2020 | Metnick | G06Q 30/0601 |
| 2020/0133921 A1* | 4/2020 | Lee | H04L 9/0637 |
| 2020/0313884 A1* | 10/2020 | Trevethan | G06Q 10/10 |

OTHER PUBLICATIONS

King Yip, Blockchain & Alternative Payment Models, TrueValueMetrics. org, Aug. 8, 2016, available at http://www.truevaluemetrics.org/DBpdfs/Technology/Blockchain/15-54-kyip_blockchainapms_080816.pdf, 9 pages. (Year: 2016).*

Smart Contracts Alliance and Deloitte, Smart Contracts: 12 Use Cases for Business & Beyond, Chamber of Digital Commerce, Dec. 2016, archived Dec. 8, 2016 at https://web.archive.org/web/20161208170106/http://digitalchamber.org/smart-contracts-12-use-cases-for-business-and-beyond.pdf, 56 pages. (Year: 2016).*

Max Janasik, Blockchain and Smart Contracts Accelerate Reimbursement Transformation, LinkedIn.com, Nov. 16, 2017, available at https://www.linkedin.com/pulse/blockchain-smart-contracts-accelerate-reimbursement-max-janasik-cpa/, 5 pages. (Year: 2017).*

Deloitte, Blockchain Technology and Its Potential Impact on the Audit and Assurance Profession, AICPA.org, 2017, archived Aug. 17, 2018 at https://web.archive.org/web/20180817213050/https://www.aicpa.org/content/dam/aicpa/interestareas/frc/assuranceadvisoryservices/downloadabledocuments/ (Year: 2017).*

[item U continued] blockchain-technology-and-its-potential-impact-on-the-audit-and-assurance-profession.pdf, 28 pages. (Year: 2017).*

Lenny DeFranco, What Would a Blockchain Expense Policy Look Like?, The Abacus Blog, Jul. 26, 2017, archived Jul. 29, 2017 at https://web.archive.org/web/20170729171311/https://blog.abacus.com/blockchain-expense-policy/, 4 pages. (Year: 2017).*

Levi, et al., An Introduction to Smart Contracts and Their Potential and Inherent Limitations, Harvard Law School Forum on Corporate Governance, May 26, 2018, avail. at https://corpgov.law.harvard.edu/2018/05/26/an-introduction-to-smart-contracts-and-their-potential-and-inherent-limitations/, 10 pp. (Year: 2018).*

Wolfie Zhao, WeChat Eyes Blockchain for Faster Corporate Expense Refunds, CoinDesk, Aug. 10, 2018, available at https://www.coindesk.com/wechat-trials-blockchain-for-faster-refunds-of-company-expenses, 3 pages. (Year: 2018).*

Chantel Soumis, 4 Ways Blockchain is Transforming Financial Data Management, Valicom Corp., Mar. 26, 2018, available at https://www.valicomcorp.com/blog/2018/3/26/4-ways-blockchain-is-transforming-financial-data-management, 6 pages. (Year: 2018).*

Lenny DeFranco, How Blockchain Could End Expense Receipt Fraud, The Abacus Blog, archived Aug. 11, 2020 at https://web.archive.org/web/20200811162331/https://blog.abacus.com/how-blockchain-could-end-expense-receipt-fraud/, 11 pages. (Year: 2020).*

* cited by examiner

DETECTING CASHBACK AND OTHER RELATED REIMBURSEMENT FRAUDS USING BLOCKCHAIN TECHNOLOGY

FIELD

The field relates generally to information processing systems, and more particularly to techniques for providing security for transactions using such systems.

BACKGROUND

Commonly, in corporate or other enterprise contexts, there are tools and/or systems which enable employees to submit personally-incurred bills pertaining to enterprise-related expenses for reimbursement. However, fraud (via bill tampering, submission of duplicate bills, etc.) represents a substantial challenge to such reimbursement systems. Additionally, in some instances utilizing certain mobile applications, received bills may not reflect a separate cashback or redemption amount granted for subsequent use via the mobile application. Accordingly, there is a significant need for detection and/or prevention techniques applicable to cashback and other related reimbursement frauds.

SUMMARY

Illustrative embodiments of the invention provide techniques for detecting cashback and other related reimbursement frauds. An exemplary computer-implemented method can include implementing, in response to a transaction between a user and a first enterprise, a block in a blockchain network, wherein the block comprises transaction-related information comprising reimbursement-related data and cryptographic information associated with the transaction. Such a method can also include generating a smart contract in conjunction with the implemented block in the blockchain network, wherein the smart contract comprises a software protocol pertaining to carrying out a reimbursement process, related to the transaction, between the user and a second enterprise. Further, such a method can additionally include executing the smart contract in response to an indication that transaction-related information provided to the second enterprise by the user has been verified against the transaction-related information contained within the implemented block in the blockchain network, and modifying, in response to the execution of the smart contract, a status identifier of the implemented block, wherein the modification of the status identifier reduces subsequent access to the implemented block in the blockchain network.

Illustrative embodiments can provide significant advantages relative to conventional reimbursement arrangements. For example, challenges associated with bill tampering and/or duplicate bill submission are overcome through the implementation of a smart contract within a blockchain-based reimbursement system. Such a blockchain-based system limits access to reimbursement-eligible transaction records subsequent to an initial verified process.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary networks and associated computers, servers, network devices or other types of processing devices. It is to be appreciated, however, that the invention is not restricted to use with the particular illustrative network and device configurations shown. Accordingly, the term "network" as used herein is intended to be broadly construed, so as to encompass, for example, any system comprising multiple networked processing devices.

Figure 1:
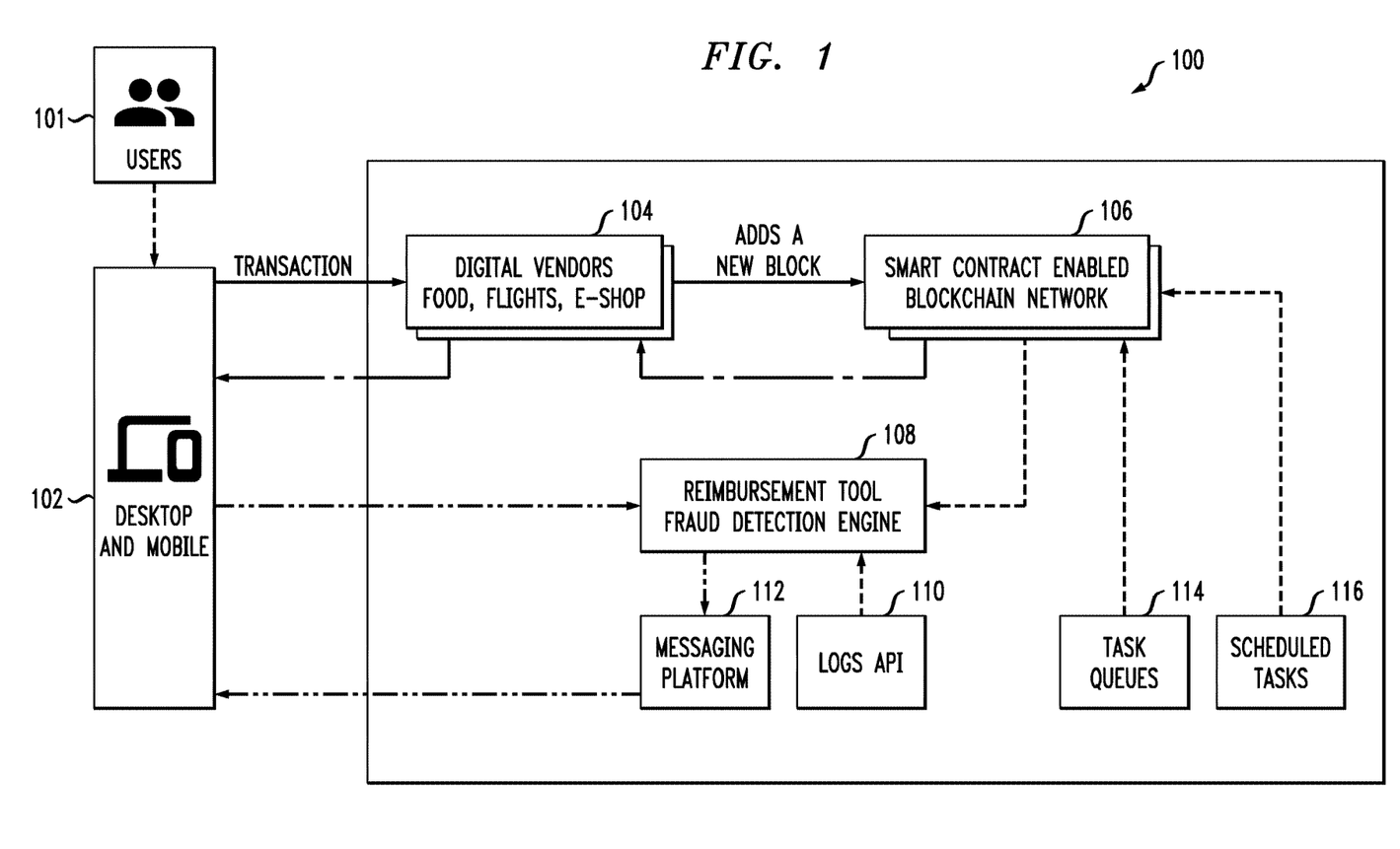
FIG. 1 shows an information processing system configured for detecting cashback and other related reimbursement frauds in an illustrative embodiment of the invention.

FIG. 1 shows an information processing system configured for detecting cashback and other related reimbursement frauds in an illustrative embodiment of the invention. By way of illustration, FIG. 1 depicts users 101, which interact with network 100 via user devices 102. Network 100 includes digital vendors 104, a smart contract-enabled blockchain network 106, and a reimbursement tool 108 (which can include a fraud detection engine). As illustrated, the users 101, via user devices 102, can interact with the digital vendors 104 in connection with one or more transactions (such as food-related purchases, travel-related transactions, e-commerce transactions, etc.).

By way of example, a digital vendor 104, in response to carrying out a transaction with a user 101, will create a block and push the block to the blockchain network 106 along with all required data models. Such data models can refer, for example, to all of the properties that a particular block will contain. For instance, some properties can be directly related to bill information, while other properties can be related to verification details such as hash information.

The blockchain network 106 includes multiple devices carrying out a consensus protocol wherein such devices (containing one or more data structures) can be utilized to store blocks of information pertaining to transactions and related cashback processes. In one or more embodiments of the invention, such a block can include information pertaining to the transaction, customer details, one or more flag values to indicate access-related information, cashback-related information, and system related information along with self-evaluating smart contracts.

As also detailed herein, in at least one embodiment of the invention, each block can additionally include a smart contract, which can include a mechanism to update one or more flag values inside the block (which can ensure singularity and authenticity of uniqueness).

FIG. 1 also depicts, as noted above, a reimbursement tool 108, which can accept block address information and public key information from a user 101 along with reimbursement details pertaining to a particular transaction between the user 101 and a digital vendor 104. In one or more embodiments of the invention, the reimbursement tool 108 will first verify the authenticity of the transaction details (such as a bill or invoice) by comparing such details with decrypted information. Accordingly, in one or more embodiments of the invention, all of the above properties can be encrypted when the block is created, and this information can then be decrypted as noted herein. Such decryption can occur, for example, with the help of a private key, which can be obtained from the block whose address the user will specify and/or provide to the reimbursement tool 108. By way of example, for cashback transactions/processes, as well as for checking the status of orders, the reimbursement tool 108 can read related data from the decrypted information and notify the user 101 if the cashback amount from the digital vendor 104 is beyond a certain threshold limit. Such a threshold limit can be determined, for example, by an enterprise and/or enterprise policies.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers." The user devices 102 in some embodiments comprise respective computers associated with a particular company, organization or other enterprise. Numerous other operating scenarios involving a wide variety of different types and arrangements of processing devices and networks are possible, as will be appreciated by those skilled in the art.

As also depicted in FIG. 1, messaging platform 112 can be used to communicate to the users and/or administrators information pertaining to any fraud detection (as detected by the fraud detection engine 108). Also, a logs application programming interface (API) 110 can be used to keep a history of the overall system (or, specifically of the fraud detection engine 108) for any general re-checking. Additionally, a task queue 114 can be provided to the blockchain network 106 and can help manage the load of the blockchain network 106. Scheduled tasks 116 can also be provided to the blockchain network 106 and can include, for example, managing the state of a block in a blockchain network.

Also, it is to be appreciated that the term "user" in this context and elsewhere herein is intended to be broadly construed so as to encompass, for example, human, hardware, software or firmware entities, as well as various combinations of such entities.

The blockchain network 106 is assumed to comprise and/or utilize a portion of a global computer network such as the Internet, although other types of networks can be part of the information processing system, including a wide area network (WAN), a local area network (LAN), a satellite network, a telephone or cable network, a cellular network, a wireless network such as a Wi-Fi or WiMAX network, or various portions or combinations of these and other types of networks. One or more embodiments of the invention can therefore comprise combinations of multiple different types of networks, each comprising processing devices configured to communicate using internet protocol (IP) or other related communication protocols.

The user devices 102 and/or the devices within the blockchain network 106 can also have associated databases configured to store data characterizing transactions and cashback processes. Such databases in one or more embodiments of the invention can be implemented using one or more storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

Additionally, the reimbursement tool 108 in the FIG. 1 embodiment is assumed to be implemented using at least one processing device. Each such processing device generally comprises at least one processor and an associated memory, and implements one or more functional modules for controlling certain features of the techniques described herein.

By way of example, such a processing device can illustratively comprise a microprocessor, a microcontroller, an application-specific integrated circuit (ASIC), a field-programmable gate array (FPGA) or other type of processing circuitry, as well as portions or combinations of such circuitry elements.

Additionally, such memory can illustratively comprise random access memory (RAM), read-only memory (ROM) or other types of memory, in any combination. Such memory and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

It is to be understood that the particular set of elements shown in FIG. 1 for detecting cashback and other related reimbursement frauds involving user devices 102 is presented by way of illustrative example only, and in other embodiments additional or alternative elements may be used. Thus, another embodiment may include additional or alternative systems, devices and other network entities, as well as different arrangements of modules and other components.

Accordingly, as further detailed herein, one or more embodiments of the invention include implementing and/or utilizing smart contract-based blockchain technology for carrying out transactions and related cashback and/or reimbursement processes, wherein the data constituent of a block contain bill/invoice details along with cashback information and a hash of the billing information inside the bill/invoice generated by digital vendors.

By way of example, whenever a transaction occurs between a user (for example, an employee of an enterprise), a new block will be added to a blockchain network (which can include, for example, a globally-available hyperledger (common to the particular industry of the enterprise or vendor in question)). Additionally, a smart contract will be written on top of the block data, which will help to ensure validity of that transaction (which will be helpful in scenarios such as returns/cancellations of orders, duplicate bills submission, etc.). In one or more embodiments of the invention, the format of a smart contract can be determined by the overall network manager, and the details of the smart contract can be communicated to a verification systems. Once the general format is set, a smart contract can be automatically added to every new block.

In accordance with one or more embodiments of the invention, a system can be implemented at the enterprise end (the enterprise employing the user involved in the transaction, for example) which will obtain and/or be provided a copy of the blockchain, and will require the user (employee) to enter the reimbursement details along with the hash of the block provided by the digital vendor. Subsequently, the enterprise-end system access the particular/relevant location in the hyperledger to verify the cashback-related information from the bill. In one or more embodiments of the invention, the enterprise-end system can crawl the hyperledger to ensure the correctness of the data. Accordingly, in such an embodiment, the information from a vendor-generated bill is verified against the information stored in the corresponding block in the blockchain. As soon as the information is verified, the smart contract associated with the block in question will get executed and cause a change to the state of the block, rendering the block unusable for subsequent users.

Figure 2:
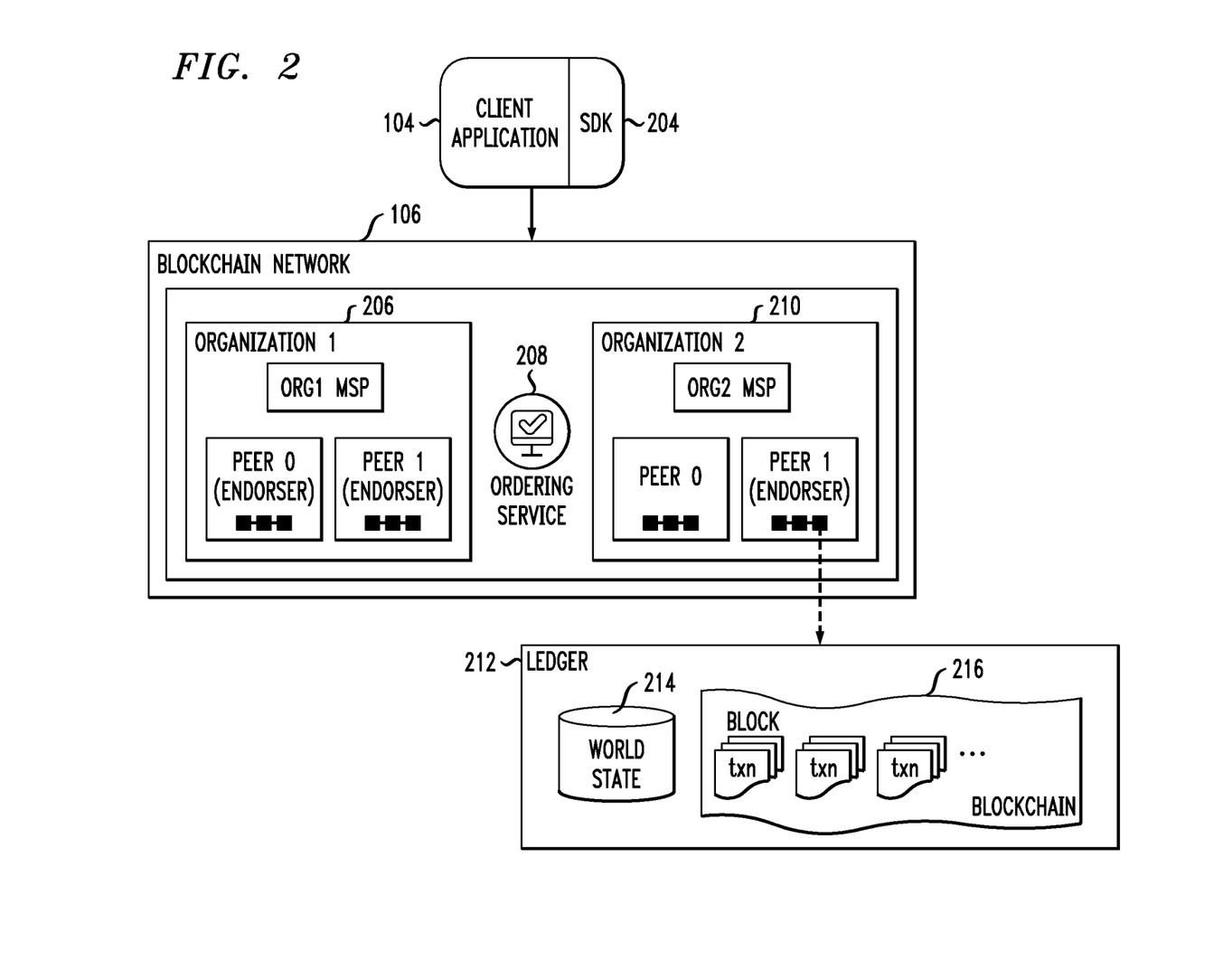
FIG. 2 shows an example workflow across system architecture in an illustrative embodiment of the invention.

FIG. 2 shows an example workflow across system architecture in an illustrative embodiment of the invention. By way of illustration, FIG. 2 depicts a client application at a digital vendor 104, which includes a software development kit (SDK) 204, and which interacts with the blockchain network 106 and provides certain rules and regulations. As also depicted in FIG. 2, the blockchain network 106 includes a first organization/device 206 and a second organization/device 210, as well as an ordering service 208. The ordering service 208 can include a system which enables a user to place an order on a vendor's website. The role of this service is similar across various vendors, but underlying architecture may change from vendor to vendor. Each such organization device (206, 210) includes an organization managed service provider (MSP) as well as a set of peers (endorsers), which can interact with blockchain network with the help of the SDK 204.

As also depicted in FIG. 2, each peer/endorser component can include a ledger 212 which includes a world state database 214 and a copy of the blockchain 216 (containing multiple transactions and related information). The world state database 214 stores the current values of a set of one or more ledger states, and the blockchain 216 includes a transaction log that records all changes that determine the world state.

Figure 3:
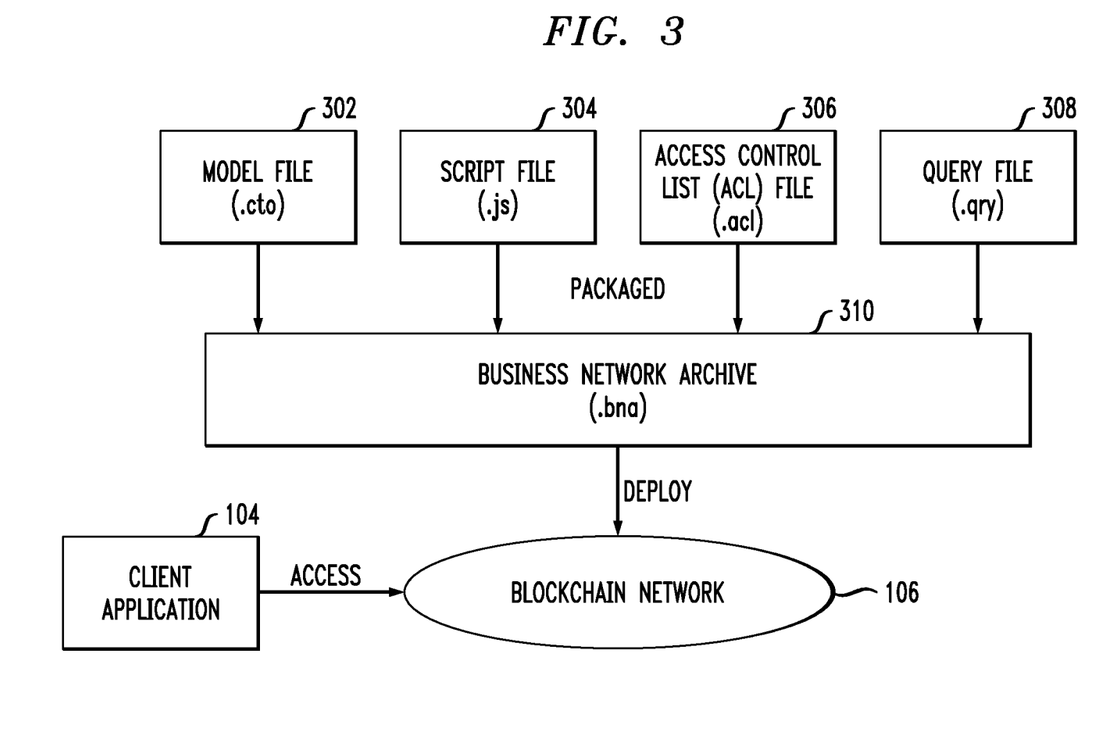
FIG. 3 shows an example workflow across system architecture in an illustrative embodiment of the invention.

FIG. 3 shows an example workflow across system architecture in an illustrative embodiment of the invention. By way of illustration, FIG. 3 depicts the client application (which can include a reimbursement tool, for example) at a digital vendor 104, which accesses the blockchain network 106, which has multiple items of data deployed thereon. Specifically, FIG. 3 depicts a model file (.cto) 302, a script file (.js) 304, an access control list (ACL) file (.acl) 306, and a query file (.qry) 308, which are packaged and provided to a business network archive (.bna) 310, which is deployed to the blockchain network 106.

Figure 4:
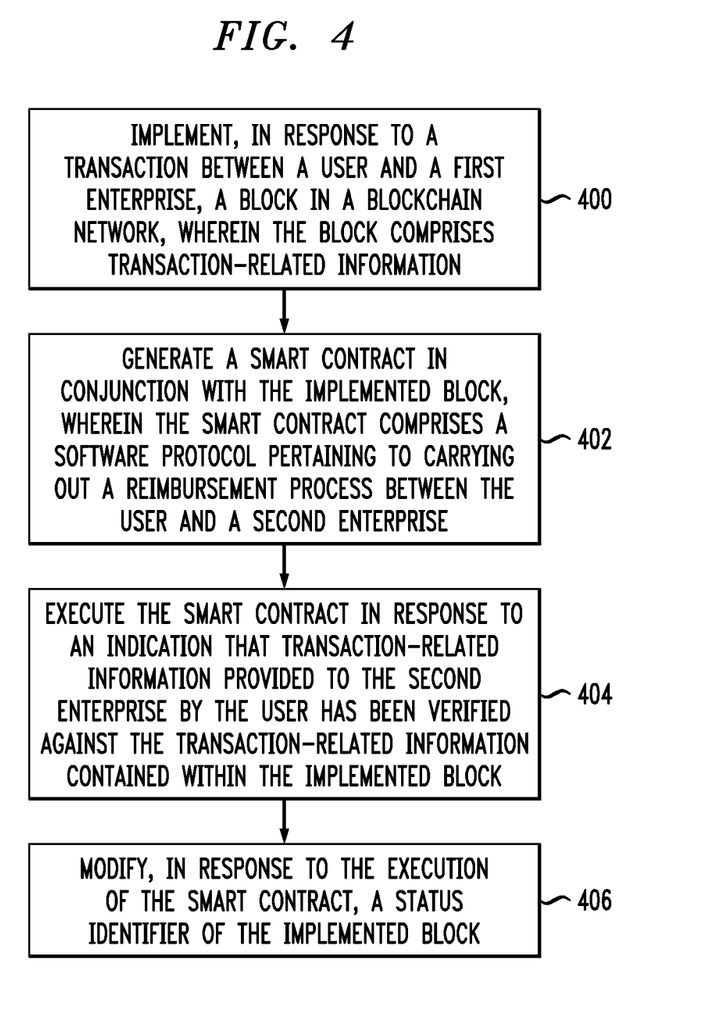
FIG. 4 is a flow diagram of a process for detecting cashback and other related reimbursement frauds in an illustrative embodiment.

FIG. 4 is a flow diagram of a process for detecting cashback and other related reimbursement frauds in an illustrative embodiment. It is to be understood that this particular process is only an example, and additional or alternative processes can be carried out in other embodiments. In this embodiment, the process includes steps 400 through 406.

Step 400 includes implementing, in response to a transaction between a user and a first enterprise, a block in a blockchain network, wherein the block comprises transaction-related information comprising reimbursement-related data and cryptographic information associated with the transaction. In one or more embodiments of the invention, the blockchain network can include a globally-available hyperledger.

The cryptographic information can include a cryptographic hash of one or more items of data associated with the transaction. Additionally, the cryptographic information can include key information, wherein the key information can include, for example, a private key associated with one or more decryption operations. Also, in one or more embodiments of the invention, the transaction-related information can include one or more user details, and the reimbursement-related data can include cashback-related information.

Step 402 includes generating a smart contract in conjunction with the implemented block in the blockchain network, wherein the smart contract comprises a software protocol pertaining to carrying out a reimbursement process, related to the transaction, between the user and a second enterprise. In at least one embodiment of the invention, the user is an employee of the second enterprise. Further, one or more embodiments of the invention includes outputting a copy of the blockchain network to the second enterprise.

Step 404 includes executing the smart contract in response to an indication that transaction-related information provided to the second enterprise by the user has been verified against the transaction-related information contained within the implemented block in the blockchain network.

Step 406 includes modifying, in response to the execution of the smart contract, a status identifier of the implemented block, wherein the modification of the status identifier reduces subsequent access to the implemented block in the blockchain network. The status identifier can include a flag value indicative of access-related information.

Accordingly, the particular processing operations and other functionality described in conjunction with the flow diagram of FIG. 4 are presented by way of illustrative example only, and should not be construed as limiting the scope of the invention in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to use smart contract-enabled blockchain technology to detect frauds in cashback and other related reimbursement processes. These and other embodiments can effectively resolve problems such as bill tampering and duplicate submission of bills within a reimbursement context.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of an information processing system may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the information processing system. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of an information processing system, these platforms may also be used to implement at least portions of other information processing systems in other embodiments.

Figure 5:
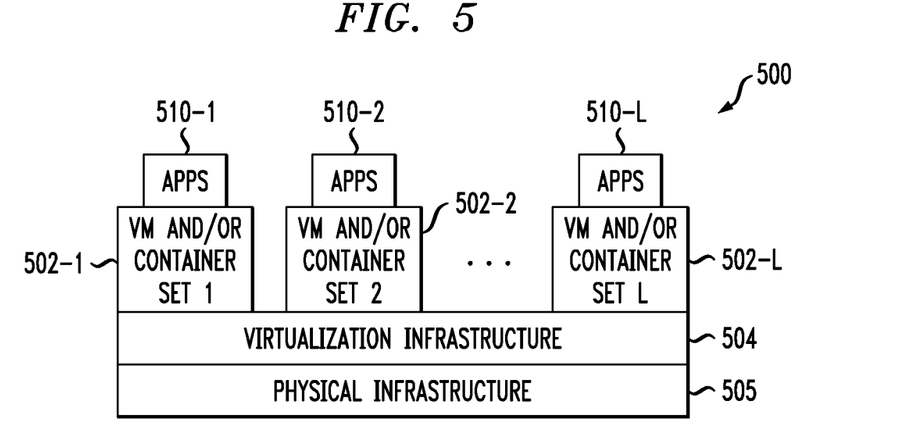
FIGS. 5 and 6 show examples of processing platforms that may be utilized to implement at least a portion of an information processing system in illustrative embodiments.
Figure 6:
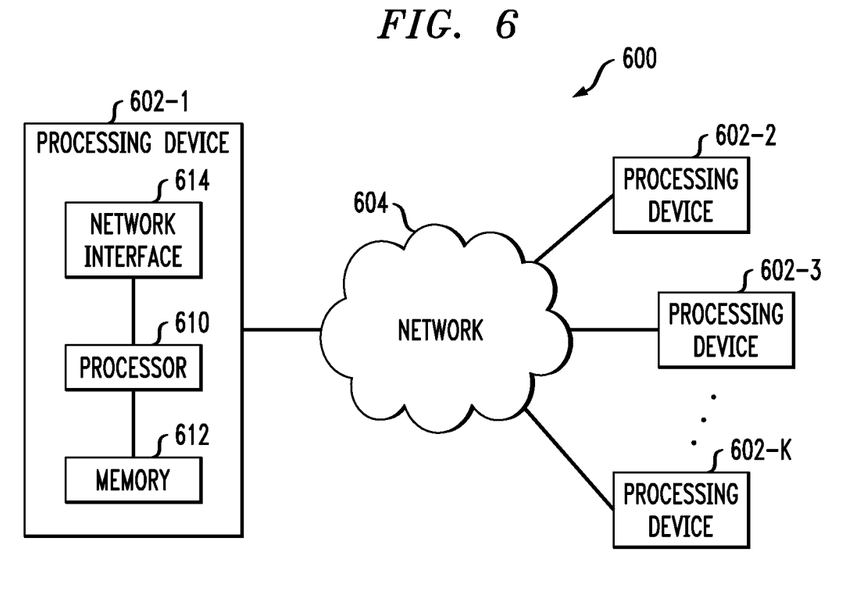

FIG. 5 shows an example processing platform comprising cloud infrastructure 500. The cloud infrastructure 500 comprises a combination of physical and virtual processing resources that may be utilized to implement at least a portion of an information processing system. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide deduplication estimate generation functionality of the type described above for one or more processes running on a given one of the VMs. For example, each of the VMs can implement deduplication control logic and associated deduplication estimate tables for providing deduplication estimate generation functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide deduplication estimate generation functionality of the type described above for one or more processes running on different ones of the containers. For example, a container host device supporting multiple containers of one or more container sets can implement one or more instances of deduplication control logic and associated deduplication estimate tables for use in generating deduplication estimates.

As is apparent from the above, one or more of the processing modules or other components of an example information processing system may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of an information processing system and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and an information processing system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in an example information processing system such as detailed herein. Such components can communicate with other elements of the information processing system over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide accurate and secure cashback transactions. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising:
encrypting transaction-related information pertaining to a transaction between a user and a first enterprise, wherein the transaction-related information comprises reimbursement-related data associated with the transaction;
implementing, in response to the transaction between the user and the first enterprise, a block in a blockchain network, wherein the block comprises the encrypted transaction-related information and cryptographic information associated with the transaction, wherein the cryptographic information comprises a private key associated with one or more decryption operations, and wherein the blockchain network comprises multiple devices each carrying out a consensus protocol and comprising one or more data structures configured for storing distinct blocks;
generating a smart contract in conjunction with the implemented block in the blockchain network, wherein the smart contract comprises a software protocol pertaining to carrying out a reimbursement process, related to the transaction, between the user and a second enterprise;
obtaining, from the user, address information attributed to the implemented block in the blockchain network;
obtaining, from the implemented block using the obtained address information, the private key associated with the one or more decryption operations;
decrypting at least a portion of the encrypted transaction-related information using the private key;
obtaining, from the user, information pertaining to the reimbursement process between the user and the second enterprise;
comparing the information pertaining to the reimbursement process with the decrypted transaction-related information;
executing the smart contract in response to an indication, based at least in part on said comparing, that the information pertaining to the reimbursement process obtained by the second enterprise from the user has been verified against the transaction-related information contained within the implemented block in the blockchain network; and modifying, in response to the execution of the smart contract, a status identifier of the implemented block, wherein the status identifier comprises a flag value indicative of access-related information;

wherein the method is performed by at least one processing device comprising a processor coupled to a memory.

2. The computer-implemented method of claim 1, wherein the cryptographic information comprises a cryptographic hash of one or more items of data associated with the transaction.

3. The computer-implemented method of claim 1, wherein the blockchain network comprises a globally-available hyperledger.

4. The computer-implemented method of claim 1, wherein the transaction-related information comprises one or more user details.

5. The computer-implemented method of claim 1, wherein the reimbursement-related data comprise cashback-related information.

6. The computer-implemented method of claim 1, wherein the user comprises an employee of the second enterprise.

7. The computer-implemented method of claim 1, further comprising:

outputting a copy of the blockchain network to the second enterprise.

8. A non-transitory processor-readable storage medium having stored therein program code of one or more software programs, wherein the program code when executed by at least one processing device causes said at least one processing device:

to encrypt transaction-related information pertaining to a transaction between a user and a first enterprise, wherein the transaction-related information comprises reimbursement-related data associated with the transaction;

to implement, in response to the transaction between the user and the first enterprise, a block in a blockchain network, wherein the block comprises the encrypted transaction-related information and cryptographic information associated with the transaction, wherein the cryptographic information comprises a private key associated with one or more decryption operations, and wherein the blockchain network comprises multiple devices each carrying out a consensus protocol and comprising one or more data structures configured for storing distinct blocks;

to generate a smart contract in conjunction with the implemented block in the blockchain network, wherein the smart contract comprises a software protocol pertaining to carrying out a reimbursement process, related to the transaction, between the user and a second enterprise;

to obtain, from the user, address information attributed to the implemented block in the blockchain network;

to obtain, from the implemented block using the obtained address information, the private key associated with the one or more decryption operations;

to decrypt at least a portion of the encrypted transaction-related information using the private key;

to obtain, from the user, information pertaining to the reimbursement process between the user and the second enterprise;

to compare the information pertaining to the reimbursement process with the decrypted transaction-related information;

to execute the smart contract in response to an indication, based at least in part on said comparing, that the information pertaining to the reimbursement process obtained by the second enterprise from the user has been verified against the transaction-related information contained within the implemented block in the blockchain network; and to modify, in response to the execution of the smart contract, a status identifier of the implemented block, wherein the status identifier comprises a flag value indicative of access-related information.

9. The non-transitory processor-readable storage medium of claim 8, wherein the cryptographic information comprises a cryptographic hash of one or more items of data associated with the transaction.

10. The non-transitory processor-readable storage medium of claim 8, wherein the transaction-related information comprises one or more user details.

11. The non-transitory processor-readable storage medium of claim 8, wherein the reimbursement-related data comprise cashback-related information.

12. The non-transitory processor-readable storage medium of claim 8, wherein the blockchain network comprises a globally-available hyperledger.

13. The non-transitory processor-readable storage medium of claim 8, wherein the user comprises an employee of the second enterprise.

14. The non-transitory processor-readable storage medium of claim 8, wherein the program code when executed by the at least one processing device further causes said at least one processing device:

to output a copy of the blockchain network to the second enterprise.

15. An apparatus comprising:

at least one processing device comprising a processor coupled to a memory;

said at least one processing device being configured:

to encrypt transaction-related information pertaining to a transaction between a user and a first enterprise, wherein the transaction-related information comprises reimbursement-related data associated with the transaction;

to implement, in response to the transaction between the user and the first enterprise, a block in a blockchain network, wherein the block comprises the encrypted transaction-related information and cryptographic information associated with the transaction, wherein the cryptographic information comprises a private key associated with one or more decryption operations, and wherein the blockchain network comprises multiple devices each carrying out a consensus protocol and comprising one or more data structures configured for storing distinct blocks;

to generate a smart contract in conjunction with the implemented block in the blockchain network, wherein the smart contract comprises a software protocol pertaining to carrying out a reimbursement process, related to the transaction, between the user and a second enterprise;

to obtain, from the user, address information attributed to the implemented block in the blockchain network;

to obtain, from the implemented block using the obtained address information, the private key associated with the one or more decryption operations;

to decrypt at least a portion of the encrypted transaction-related information using the private key;

to obtain, from the user, information pertaining to the reimbursement process between the user and the second enterprise;

to compare the information pertaining to the reimbursement process with the decrypted transaction-related information;

to execute the smart contract in response to an indication, based at least in part on said comparing, that the information pertaining to the reimbursement process obtained by the second enterprise from the user has been verified against the transaction-related information contained within the implemented block in the blockchain network; and to modify, in response to the execution of the smart contract, a status identifier of the implemented block, wherein the status identifier comprises a flag value indicative of access-related information.

16. The apparatus of claim 15, wherein the cryptographic information comprises a cryptographic hash of one or more items of data associated with the transaction.

17. The apparatus of claim 15, wherein the transaction-related information comprises one or more user details.

18. The apparatus of claim 15, wherein the blockchain network comprises a globally-available hyperledger.

19. The apparatus of claim 15, said at least one processing device being further configured:

to output a copy of the blockchain network to the second enterprise.

20. The apparatus of claim 15, wherein the reimbursement-related data comprise cashback-related information.

* * * * *